Dec. 23, 1930.  E. M. BROGDEN  1,786,405
APPARATUS FOR TREATING FRUIT AND THE LIKE
Original Filed July 23, 1923  3 Sheets-Sheet 1
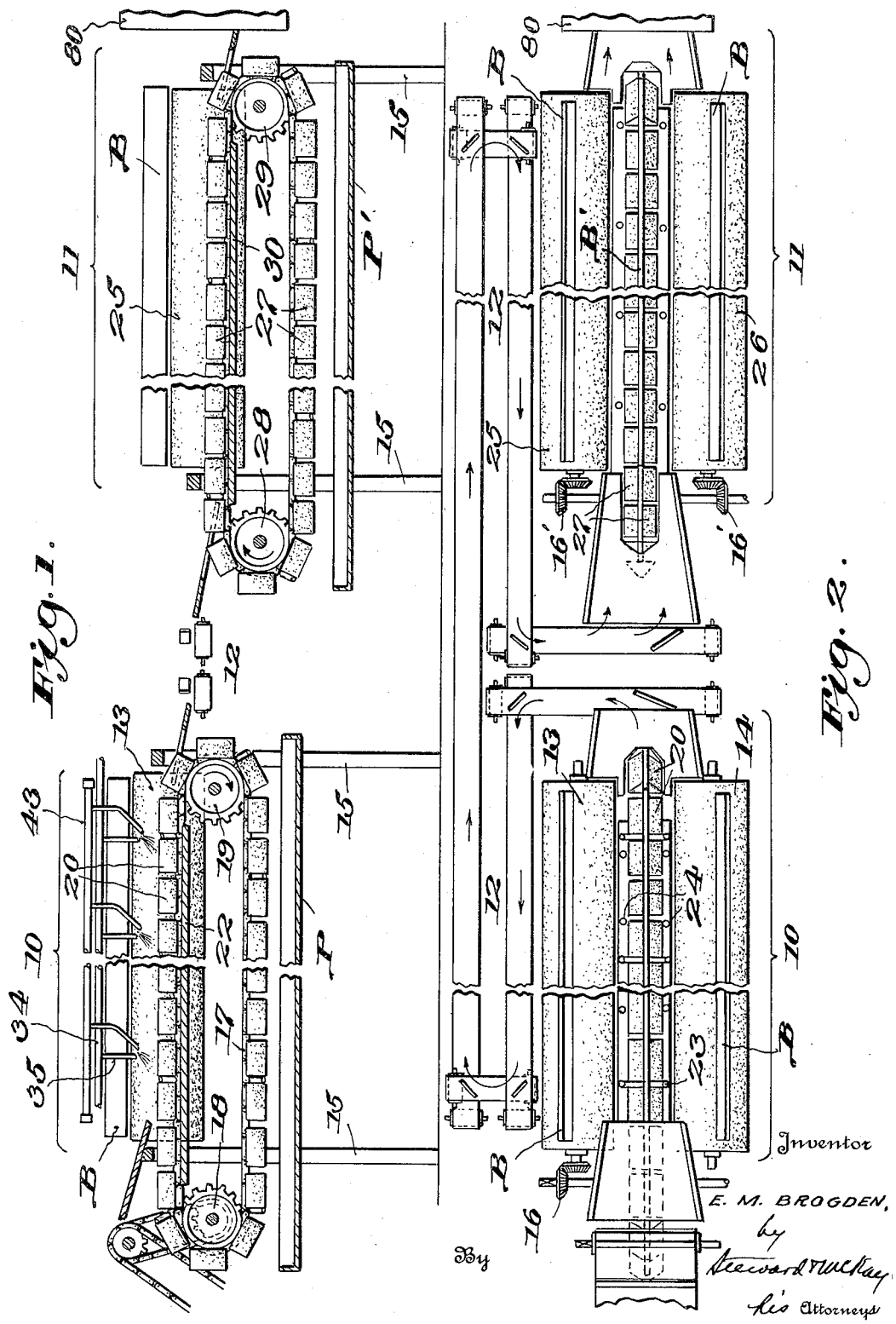
Inventor
E. M. BROGDEN,
by
Steward & McKay
his Attorneys Dec. 23, 1930.  E. M. BROGDEN  1,786,405
APPARATUS FOR TREATING FRUIT AND THE LIKE
Original Filed July 23, 1923   3 Sheets-Sheet 2
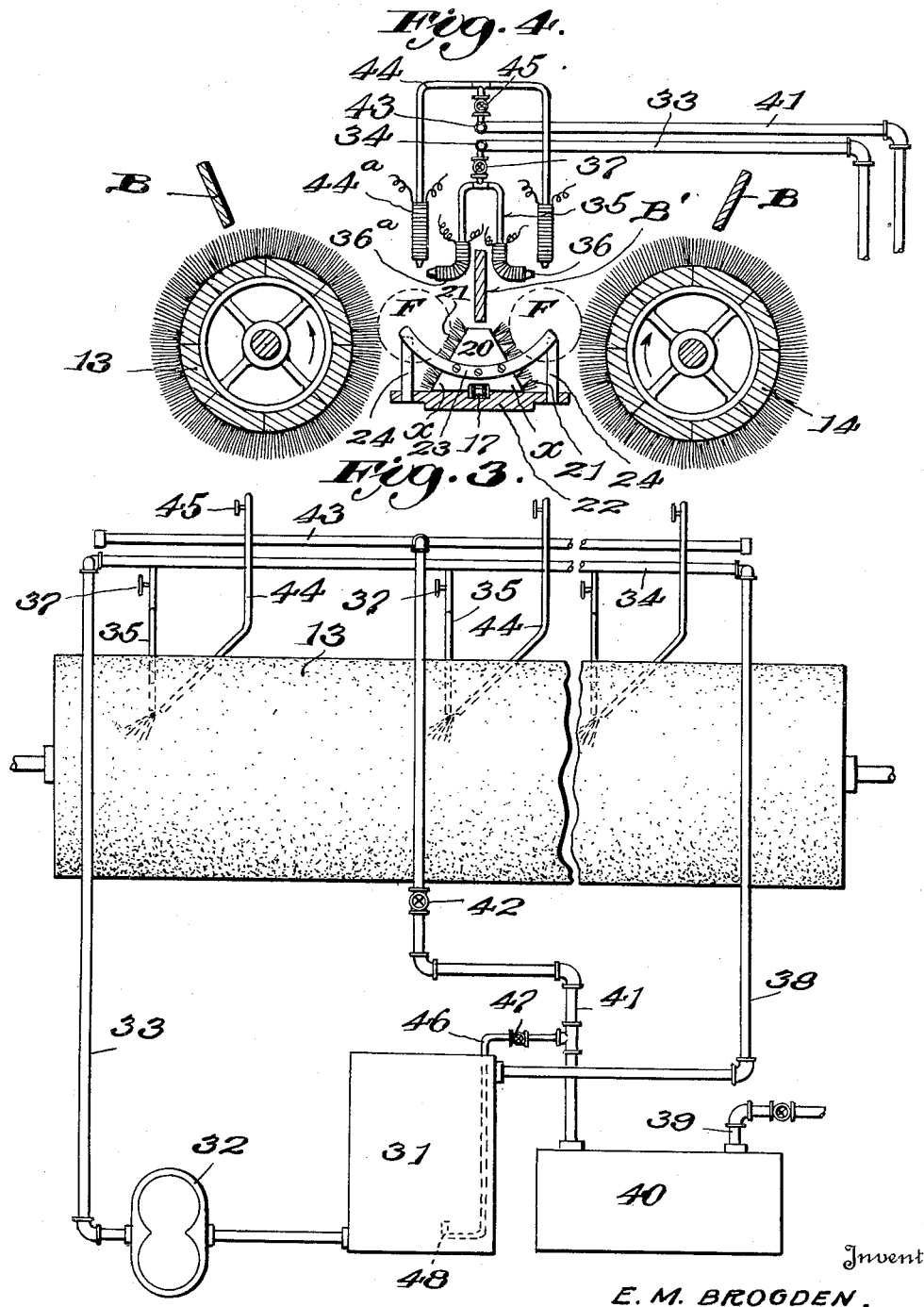
Inventor
E. M. BROGDEN,

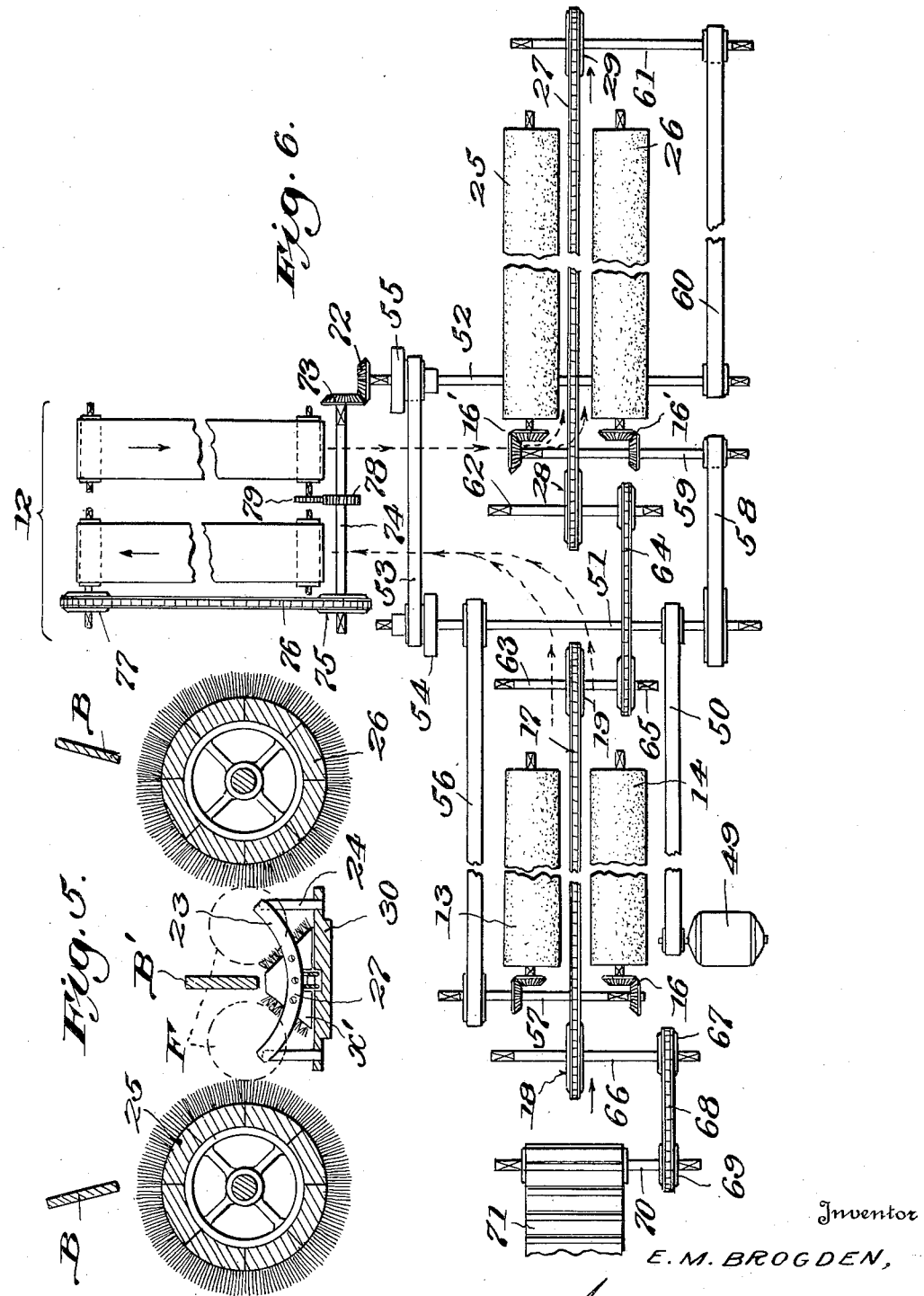

Patented Dec. 23, 1930

1,786,405

UNITED STATES PATENT OFFICE

ERNEST M. BROGDEN, OF POMONA, CALIFORNIA, ASSIGNOR TO BROGDEX COMPANY, OF LOS ANGELES, CALIFORNIA, A CORPORATION OF FLORIDA

APPARATUS FOR TREATING FRUIT AND THE LIKE

Original application filed July 23, 1923, Serial No. 653,227, now Patent No. 1,671,924. Divided and this application filed May 19, 1928. Serial No. 279,056.

This invention relates to apparatus for treating fruit and the like; and it relates more particularly to apparatus disclosed in my prior pending application Serial No. 653,227, filed July 23, 1923, of which the present application is a division.

The novel apparatus is particularly adapted to treat fruit and vegetables in such manner as to cleanse the same of undesirable foreign matter adhering thereto and to provide the fruit with a film-like protective coating of such character as to enhance its keeping qualities and thus facilitate its transportation to and sale in distant markets.

The treatment of fruit in the manner outlined generally above forms the subject-matter of several prior copending applications of this applicant, the present invention being directed more particularly to apparatus suitable for use in the handling of fruit in accordance with the general principles laid down in the prior applications aforesaid.

The apparatus, in the particular form here illustrated, comprises two units, each embodying the principles of the invention and adapted to divide the treatment of fruit into two main stages. The first unit of the apparatus is designed to apply to the fruit with great thoroughness a treating liquid to cleanse the fruit or to provide it with an eventual film coating of a protective or preservative nature, or to effectuate both of the purposes, and is also designed to rub the fruit thoroughly but not roughly, in order to remove dirt and other foreign matter.

The second unit of the apparatus is designed to smooth and polish the fruit in such manner as to remove residual dirt and excess treating material, so that the fruit, at the end of this stage, is thoroughly cleansed and provided with an extremely thin film coating of protective or preservative material, the film being continuous and unifrom in character and invisible except upon careful and expert scrutiny.

Means for interposing an interval of time between the passage of fruit through the first and second units are generally desirable as a matter of practice, since it permits the treating fluid to exercise a solvent or loosening action on foreign matter not removed by the rubbing means of the first unit. Hence the second unit is more effective in removing any remaining scale, smudge or other foreign matter.

The present application relates more particularly to the individual rubbing or scrubbing units rather than to the combination of such units with means for interposing an interval of time between the passage of fruit through such units.

Broadly speaking, the rubbing or scrubbing of fruit is well known, one of the customary methods being by means of rotating brush rolls. The fruit in such cases is rubbed or brushed as it passes longitudinally along a cylindrical brush-roll. Such machines as have been used heretofore have not been wholly satisfactory, especially as regards control of the rate and character of movement of the fruit along the brush rolls.

Attempts have been made to secure some control over the rate of movement of the fruit but such control has been only partial and further such attempts have resulted in machines of low capacity because the principle of construction adopted permitted only a single fruit runway per operating unit, or because the means used for supporting the fruit in engagement with the brush-roll had no substantial cleaning, rubbing or polishing action, or for other reasons.

A further difficulty experienced with prior machines has been that the fruit tends to spin about a constant axis so that some parts of its surface are brushed to a considerably greater extent than others.

According to the present invention these difficulties and disadvantages of prior apparatus are largely overcome by using two brush-rolls with a conveyor device traveling longitudinally therebetween, the sections of which device have oppositely inclined and brush-faced sides each of which is adjacent to and cooperates with one of the brush-rolls. In this way each unit has two fruit runways and each run-way has two brushing surfaces, one on the brush-roll and the other on the conveyor sections. This construction gives the unit high fruit-treating capacity. The rate of movement of the fruit through the unit may be varied by changing the rate of movement of the conveyor.

The apparatus of the present invention also is especially well adapted to attain rotary or turning movements of the fruit about a constantly changing axis, which is highly desirable in order that all portions of the surface may be thoroughly rubbed or scoured by the moving rubbing surfaces. This may be accomplished by the use in the runways of fruit retarding means adapted to exert pressure on the fruit below the top. Pressure exerted on the top of the fruit tends to cause the fruit to jump out of the runways. In the best embodiment of the present apparatus, this is effected by means of flexible projections or abutments extending into the path of travel of the fruit through the apparatus, these projections serving to arrest the fruit temporarily and to compel a change in the axis of rotation. Most desirably members in the nature of pushers are also provided to cooperate with the aforesaid retarding projections or abutments by gently forcing the fruit against and over said projections, thus enhancing the turning movements induced by said projections.

In order to afford a fuller understanding of the nature of the invention, a practical embodiment of the novel apparatus will now be described in detail, it being understood however that the description of this specific embodiment is merely illustrative and is not restrictive.

Referring to the accompanying drawings which illustrate the apparatus more or less diagrammatically, Figure 1 is a view, mainly in side elevation, with certain parts removed to disclose structure behind them and with other parts in section, showing the general arrangement of the apparatus system;

Fig. 2 is a plan view of said system, with certain parts removed for the sake of clearness;

Fig. 3 is an enlarged view, in side elevation, showing details of the means for supplying and circulating fluid treating material;

Fig. 4 is a transverse vertical section, on an enlarged scale, through the composition-applying unit of the system;

Fig. 5 is a similar transverse section through the finishing unit; and

Fig. 6 is a schematic layout of the driving gearing and connections of the various parts of the system.

The apparatus here illustrated may be generally described as comprising principally two rubbing or brushing units, indicated generally at 10 and 11, and operatively associated in series to treat fruit in successive stages, unit 10 being adapted to apply a liquid or fluent treating material to fruit and to rub the same thoroughly thereover, while unit 11 completes the treatment. At 12 is indicated generally conveyor means interposed between units 10 and 11 and arranged to deliver fruit from the first to the second unit after a predetermined delay.

The units 10 and 11 may be similar in general construction, differing only in certain respects as will hereinafter appear. Referring more particularly to unit 10, this unit comprises two cylindrical brush rolls 13 and 14 which are spaced apart as shown and are suitably journaled at their ends in supporting frame-work 15 for rotation about their longitudinal axes, the rolls being suitably driven in opposite directions as by means of bevel gearing indicated generally at 16. As here illustrated, the brush rolls are horizontally disposed, but they may be inclined slightly either toward the receiving end (at the left in Figs. 1 and 2) or toward the delivery end (at the right). As will appear more fully hereinafter, it is most advantageous either to have the rolls horizontal as shown or slightly inclined upwardly toward the delivery end. Disposed in the space between the brush rolls 13 and 14, is an endless brush and conveyor mechanism adapted, during its upper run or pass, to travel longitudinally of and between the brush rolls 13 and 14 and to cooperate therewith in properly rubbing the fruit while at the same time advancing it toward the delivery end of the unit. This endless brush and conveyor mechanism comprises an endless chain 17 running over sprockets 18 and 19, and carrying brush blocks indicated generally at 20, which blocks are individually secured to the conveyor chain in any suitable manner. As best shown in Fig. 4, said blocks 20 are of generally triangular or inverted V-shaped cross section and each is secured to the conveyor chain 17 on one side or base, the other two sides or inclined lateral faces being provided with a surfacing of brush bristles as indicated at 21, and these brush bristles, as well as those of the brush rolls 13 and 14, being most desirably fairly soft and flexible. Horsehair is ideal material and is recommended for the purpose. In its upper run, the endless chain brush mechanism slides upon a stationary supporting strip or board 22 which is centrally grooved to receive and guide the conveyor chain 17 to which the brush blocks 20 are secured, each of said brush blocks being similarly grooved or recessed on the side fastened to said chain, as shown. It is apparent that the upper run of the endless brush and conveyor mechanism cooperates with the aforesaid cylindrical brush rolls 13 and 14 to provide two trough-shaped runways for fruit, such fruit being indicated at F. The arrangement of the parts is such that fruit cannot fall down through the machine, but is supported in proper position by the cooperating brushing surfaces, as shown. The endless brush-block mechanism is driven through the sprocket 19 in such manner that the upper pass travels toward the discharge end of the machine as indicated by the arrow in Fig. 1. As will hereinafter appear more fully, the speed at which the endless brush-block mechanism advances may be varied independently of the rotary brush-roll speed. In order to advance the fruit positively toward the discharge end of the machine, the endless brush-block mechanism is provided at suitable intervals with pushers 23, each of which may be secured to one end of a brush-block 20 in the space between it and the next block in the series, said pusher projecting into the fruit runways from the opposite inclined faces of the block. These pushers are adapted to engage the fruit as the brush-block mechanism advances, thus positively feeding the fruit through the machine. This forward feeding movement may also be induced to some extent by spirally grooving the brush-rolls 13 and 14, if desired. These pushers are not so necessary when the brush-rolls are inclined forwardly toward the delivery or discharge end of the apparatus.

If desired, division boards B may be mounted, one above each brush-roll, to extend longitudinally of the same; while a similar division board B' extends longitudinally above the brush-block mechanism. These division boards serve to prevent fruit from jumping out of the respective runways as it may tend to do in exceptional instances. It is to be understood that the apparatus may have but one runway, instead of a plurality as here shown.

In order to favor more or less gentle tumbling and irregular movements of the fruit upon varying axes as it goes through the machine, and thus to enhance the thoroughness and uniformity of the rubbing and brushing effect obtainable, upright members 24 may be mounted in the stationary supporting strip or board 22 in such manner as to project upwardly into the path of fruit advancing along said runways. Said members 24 may be supported for adjustment vertically, as by mounting them frictionally in holes in the board 22. These members 24, especially if long enough to project into the path of the pushers 23, should be made of flexible material such as rubber hose so as to yield to comparatively light pressure and thus also to avoid injuring the fruit.

Up to this point, the description of unit 10 applies equally well to unit 11, the horizontal rotary brush-rolls of the latter being indicated at 25, 26, and the endless brush-block mechanism being indicated generally at 27, said mechanism being carried by sprockets 28 and 29. Suitable receptacles, such as pans P and P', may be placed under units 10 and 11 to catch material falling from the brushes.

While the detailed construction and arrangement of the endless brush-block mechanism of units 10 and 11 may be identical, it is desirable, because of the different rates of speed at which the brush-rolls are driven in units 10 and 11, respectively, to modify said construction and arrangement in certain respects to obtain the best results in each unit. In general, the arrangement of the endless brush-block mechanism in unit 10, where the speed of brush-roll rotation is relatively low, should be such that the fruit passing through this unit is carried somewhat higher with respect to the brush-roll centers, in such manner as to bear with somewhat more of its weight against said brush-rolls, than is the case in the higher speed unit 11. Accordingly in unit 10, the brush-blocks are desirably of such cross section that their brush faces are steeper or more sharply inclined to the horizontal than are the brush blocks in unit 11. For example, the base angles X of the brush-blocks in unit 10, as best shown in Fig. 4, may be about 65° in a typical example; while the corresponding angles X' (Fig. 5) of the brush blocks of unit 11 may be 45° to 50°. Furthermore, the supporting strip or board 30 of unit 11, which corresponds to the strip 22 of unit 10, may desirably be a couple of inches or so lower than said strip 22.

The unit 10 is provided with an air brush system for applying liquid or fluent treating material to fruit passing through the fruit runways of said units. In the present example this treating material is assumed to be an emulsion-like composition comprising paraffin and an oily vehicle, together with water, all as will be more fully hereinafter set forth. In applying such a composition to fruit, it is important that the application be made as uniformly as possible and that the composition itself be maintained uniform in character. To this end it is desirable that the composition be constantly agitated to prevent separation occurring to a greater or less extent. The system herein disclosed is well adapted to answer the foregoing requirements and is especially to be recommended, but it is not to be inferred that the invention is restricted to the employment of this specific means for applying treating material to the fruit. Referring to the system shown in the drawings, a supply of fluent treating material is contained in a suitable receptacle 31 from which it is drawn by pump 32 and sent under as low pressure as possible through supply pipe 33 to header 34, which header extends longitudinally above the brush rolls and endless brush block mechanism of the unit. From this header 34, lateral branches 35 extend oppositely in pairs over the fruit runways, each branch terminating in a small-orificed nozzle 36. The feed of treating material from the header 34 to said branches 35 is suitably controlled and regulated by valves 37. As many pairs of these branches 35 may be provided as is necessary or desirable. Return-flow pipe 38 returns from header 34 to receptacle 31 the surplus treating material not discharged through the lateral nozzle pipes 35. The pump 32 may be operated continuously, thus maintaining constant circulation and agitation of the treating material through pipes 33, 34, and 38, and the supply receptacle 31, while the desired limited quantities of said material are withdrawn from the supply circuit through the lateral nozzle pipes 35. Compressed air for operating the air-brushes is supplied from a compressor (not shown) through valve supply pipe 39 to compressed air tank 40, from which latter it is lead through pipe 41 adjacent to the header 34. Branch pipes 44 extend oppositely in pairs from the air line 43, and the supply of compressed air for each pair is regulated and controlled by a valve 45. Each branch 44 terminates in a fine-orificed jet discharging operatively adjacent each liquid nozzle 36 in such manner as to draw the treating material therefrom and atomize it to give a spray directed downwardly upon the fruit in the fruit runways immediately below. By employing known or suitable types of nozzles and jets, the spray may be either the ordinary conical spray here shown, or it may be flattened or fan-shaped. Electric heating coils 36ᵃ and 44ᵃ, wound upon the liquid and air nozzles, respectively, and energized by any suitable source of current, may advantageously be employed to heat the liquid treating material and the air just as they leave their respective nozzles. This renders the coating material still easier to spread upon the fruit in an exceedingly thin film.

From air supply pipe 41 leads a branch pipe 46, valved at 47, this pipe extending into the lower part of supply reservoir 51 and terminating in a discharge outlet 48 therein. This enables a controllable amount of air under pressure to be continuously admitted into the supply of treating material in receptacle 31 in order to assist in maintaining the treating material in a state of agitation. If desired the unit 10 may be enclosed within a housing (not shown) to prevent escape of the sprayed or atomized material into the surrounding atmosphere.

The conveyor unit 12 interposed between the rubbing or brushing units 10 and 11 may take any appropriate form adapted to effect delivery of fruit from unit 10 to unit 11 after a predetermined delay. In this instance said conveyor is of the belt type, which is satisfactory in practice and of which the construction is well-known.

Referring to Fig. 6, the motor 49 supplies power through belt 50 to main power shaft 51 for operating the apparatus system as a whole. Shaft 51, in turn, drives the variable speed counter-shaft 52 through a belt 53 which can be shifted upon the cooperating stepped cone pulleys 54 and 55 to vary the speed of said counter-shaft as desired. From the main power shaft 51 the rotary cylindrical brush-rolls of the units 10 and 11 are driven at constant but differing speeds. Through belt 56 is driven the shaft 57 which in turn transmits power for rotating the brush-rolls 13 and 14 of unit 10 through the aforesaid bevel gear mechanism 16. Similarly power is transmitted through belt 58 to shaft 59 which carries the bevel gear 16′ to drive the rotary brush-rolls 25 and 26 of unit 11; but in this case the driving ratio is substantially higher.

The variable speed counter-shaft 52 transmits power to drive all the conveyor parts of the system. Through belt 60 it drives the shaft 61 carrying the aforesaid sprocket 29, which latter, through brush-block chain 27 drives sprocket 28 and its supporting shaft 62. Shaft 62 in turn drives shaft 63 and sprocket 19 through chain 64 and sprocket 65. Sprocket 19 drives sprocket 18 and its supporting shaft 66 through brush-block chain 17; while sprocket 67 and shaft 66 driving through chain 68, sprocket 69 and shaft 70, actuates the fruit elevator 71 by which fruit is fed to unit 10. Shaft 52 also drives the outgoing run of conveyor drive 12 through bevel gears 72, 73, shaft 74, sprocket 75, chain 76 and sprocket 77; while it also drives the incoming run of said conveyor device in the opposite direction through spur pinions 78 and 79.

It is apparent therefore that by shifting the belt 53 on the stepped cone pulleys 54 and 55, all the parts of the apparatus system that convey or advance the fruit positively through the apparatus system can be made to run faster or slower without affecting the rotative speed of the brush-rolls of either unit.

At 80 is conventionally indicated a drier or solvent evaporator into which fruit is discharged from unit 11 and in which at least a part of the solvent vehicle and moisture (if a composition containing water is used) is removed with the aid of heat and air currents. The temperature employed in the drier may be 130°–140° F. in a typical instance. Various types of driers are suitable and commercially available for the purpose.

In employing the described apparatus to carry out the process of the invention, the fruit to be treated is fed into the runways of the first unit 10 by the elevator 71. The fruit may or may not have been subjected previously to a cleansing treatment of some kind, but in the present illustrative example it will be assumed that it has not and that it goes into unit 10 just as it is received at the packing house from the grove. Immediately upon entering the runways of unit 10, the fruit encounters a spray or atomizing jet of the treating fluid projected upon it by the air brush mechanism before described, the jets from the air brush device being most desirably directed down upon the entering fruit from a height of say four inches or so above the fruit and at an angle of 45° or thereabouts to meet the advancing fruit, thus increasing the effective length or sweep of the spray. Simultaneously, the fruit is subjected to the rubbing action of one of the rotary cylindrical brushes on the one hand and of the rectilinearly advancing brush-blocks 20 on the other. The rotation of the brush-roll tends to cause the fruit also to turn or spin, but this spinning is retarded and largely checked by the conveyor brushes 20 which have a braking action on the fruit and materially slow up its rotation. This enhances the effectiveness of the brushing action which obviously becomes greater as the fruit approaches a stationary condition. The forward movement of the brush-blocks also tends to vary the axis upon which the fruit rotates, and this effect is still further enhanced by the cooperation of the pushers 23 and the stationary flexible turning or abutment members 24; so that as the fruit is advanced through the runways it turns on many different axes and is thoroughly rubbed over its entire surface including the stem end which often escapes rubbing altogether in prior apparatus as commonly designed. If the brush-rolls are inclined slightly upward toward the delivery end, the rubbing and scrubbing action upon the fruit is still further enhanced. The relatively soft horsehair brushing surfaces, most desirably employed in both units, permit vigorous rubbing of the fruit without injury thereto.

As the fruit travels toward the discharge end of unit 10 it encounters a spray jet of treating fluid from each of the series of air brushes above the particular runway through which the fruit is moving and the treating material is thus spread all over the fruit quickly and uniformly. In the present instance the treating material is assumed to be an emulsion-like mixture comprising principally paraffin wax, an oily vehicle and water, blended in such manner as to provide a milky composition that is freely fluent and easily atomized by the air brush devices. The air jets 44 act substantially like suction ejectors to draw the composition out of the nozzles 36; and by thus avoiding the use of substantial pressure upon the fluid material, clogging of the fine-orificed nozzles 36 by solidified paraffin is avoided, and continuous operation for long periods of time without interruption is thus made possible.

After having had the combined cleansing and preservative composition thoroughly rubbed all over its surface in unit 10, and having been cleansed meanwhile to a substantial extent, the fruit is automatically delivered from the fruit runways to the conveyor system 12, the fruit resting quietly as it is carried by the conveyor belts on its way to unit 11. This interval gives the treating material ample time to continue its solvent and loosening effect upon any stubbornly adherent foreign matter that may still remain on the surface of the fruit; so that by the time the fruit reaches unit 11 any remaining adherent foreign matter is ordinarily so loosened that the subsequent high speed rubbing in unit 11 dislodges and removes it easily.

Upon leaving conveyor 12 and entering the runways of unit 11, the fruit immediately comes in contact with the brushing surfaces of the rotary brush rolls which are driven at a materially higher rate of speed than are the brush rolls of unit 10. The endless brush conveyor 27, however, may, and usually does, operate at the same linear speed as does the corresponding mechanism in unit 10, and it therefore advances the fruit through unit 11 at the same rate. The gentler slope of the brushing surfaces of the brush-blocks, and the lower setting of the blocks with respect to the brush-roll axes as the series of blocks pass between said brush-rolls, are such that more of the weight of the fruit rests upon the brush-blocks than it did when passing through unit 10. This causes the brush blocks of unit 11 to exercise a greater braking effect upon the spinning of the fruit than did the brush-blocks in unit 10; so that, not withstanding the much higher rotative speed of the brush-rolls in unit 11, the fruit, although spinning or turning over somewhat faster than it did in unit 10, does not spin proportionately faster. This is advantageous because it is desirable to realize to a very large extent the thorough thinning-out or brushing-out action of the high speed brush rolls of unit 11 in obtaining an extremely thin film coating of the preservative material on the fruit as a final result of the treatment.

What is claimed is:

1. Apparatus for treating fruit comprising the combination, with a rotary cylindrical rubbing roll, of an endless traveling conveyor device mounted to travel with a flight thereof substantially parallel to the roll axis and having members adapted to cooperate with said rubbing roll in supporting fruit to be treated and operative to advance fruit longitudinally of said roll, and fruit-retarding means mounted to project into the path of travel of fruit so advanced and adapted to exert pressure on the fruit below the top thereof.

2. Apparatus for treating fruit comprising the combination, with a rotary cylindrical rubbing roll, of an endless traveling conveyor device mounted to travel with a flight thereof substantially parallel to the roll axis and having members adapted to cooperate with said rubbing roll in supporting fruit to be treated and operative to advance fruit longitudinally of said roll, fruit-retarding means mounted to project into the path of travel of fruit so advanced and adapted to exert pressure on the fruit below the top thereof, and pusher means carried by said conveyor device for pushing fruit past said fruit-retarding means.

3. Apparatus for treating fruit comprising the combination, with a rotary cylindrical rubbing roll, of a plurality of members flexibly connected to form an endless conveyor device, means supporting said conveyor device for travel with a flight thereof substantially parallel to the rubbing roll axis and with the conveyor members of said flight in fruit-supporting cooperation with said rubbing roll, of stationarily supported flexible fruit-retarding means mounted to project into the path of travel of fruit advanced by said conveyor and adapted to exert pressure on the fruit below the top thereof.

4. Apparatus for treating fruit comprising the combination, with a rotary cylindrical rubbing roll, of a plurality of members flexibly connected to form an endless conveyor device, means supporting said conveyor device for travel with a flight thereof substantially parallel to the rubbing roll axis and with the conveyor members of said flight in fruit-supporting cooperation with said rubbing roll, of stationarily supported flexible fruit-retarding means mounted to project into the path of travel of fruit advanced by said conveyor and adapted to exert pressure on the fruit below the top thereof, and pusher members attached to said conveyor device at spaced intervals to push fruit along against the resistance offered by said retarding means.

5. Apparatus for treating fruit comprising the combination, with a pair of cylindrical brush-rolls rotatably mounted in spaced-apart relation but with their axes parallel, of a series of fruit supporting brush members substantially triangular in cross-section flexibly connected together to form an endless chain device, sprockets carrying said endless chain device for longitudinal movement of said fruit supporting brush members parallel with and between said brush-rolls, each said fruit-supporting member having two free sloping brush-surfaced sides cooperating with said brush-rolls to provide a double brushing runway for fruit, and means for driving said brush-rolls and said endless chain device, said endless chain device having laterally projecting portions adapted to engage fruit and to aid in advancing the same through said double runway.

6. Apparatus as set forth in claim 5, further characterized by the fact that said projecting portions comprise pusher devices carried by said fruit-supporting members and projecting into the double runway for positively advancing fruit therealong, and by the provision of flexible retarding devices stationarily mounted to project into said double runway for cooperation with said pusher devices in turning the fruit to change its axis of spin or rotation.

7. Apparatus for treating fruit comprising the combination, with rubbing means that provides a runway for fruit, of fruit-retarding means arranged to project into the path of travel of fruit in said runway and adapted to exert pressure on the fruit below the top thereof.

8. Apparatus as set forth in claim 1 in which the fruit-retarding means project upwardly into the path of travel of the fruit.

9. Apparatus as set forth in claim 7 in which the fruit retarding means project upwardly into the path of travel of the fruit.

10. Apparatus for treating fruit comprising the combination, with a rotary cylindrical rubbing roll, of an endless conveying and rubbing device mounted to travel longitudinally of and parallel to said rotary rubbing roll and cooperating therewith to provide a fruit-rubbing runway, said endless device comprising a plurality of rubbing members flexibly connected together in series and having laterally projecting portions adapted to engage fruit and to aid in advancing the same through said runway, and means for driving said rotary rubbing roll and said endless device.

In testimony whereof I hereunto affix my signature.

ERNEST M. BROGDEN.